United States Patent Office 3,383,888
Patented May 21, 1968

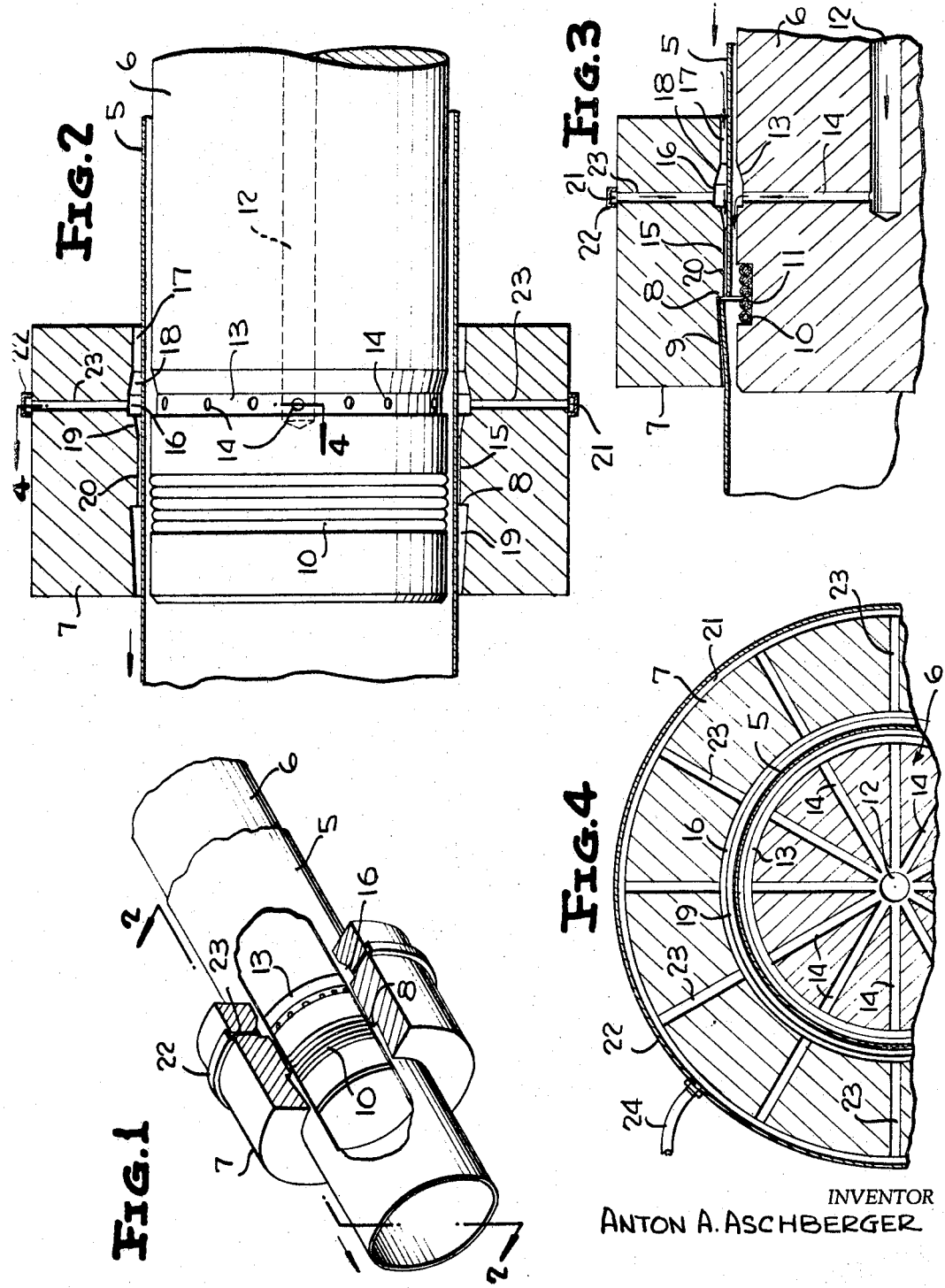

3,383,888
MAGNETIC CUTOFF GUIDING AND
POSITIONING OF TUBING
Anton A. Aschberger, Chicago, Ill., assignor to Continental Can Company, Inc., New York, N.Y., a corporation of New York
Filed Dec. 17, 1963, Ser. No. 331,232
19 Claims. (Cl. 72—55)

This invention relates in general to new and useful improvements in the cutting of tubing into predetermined lengths, and more particularly to novel improvements in the cutting off of tubing into predetermined can body forming lengths.

This invention primarily relates to the use of air as a bearing for the supporting of a moving tube and during the cutting off thereof. It is fully realized that in the past air has been utilized as a bearing. However, such air bearings have been of the rotary type and have not been suitable for the supporting of axially moving objects.

A primary feature of this invention is the use of air both for the purpose of supporting an axially moving tube as it passes with respect to a die, and the utilization of the same air which functions as a bearing for the tube to re-form the tube immediately after the cut off of a section thereof due to the momentary build up of air pressure resulting from the restriction of the flow thereof by the distortion of the tube in the cut off operation.

Still another object of this invention is to provide a novel method of supporting and re-forming a tube after the cutting off of a section thereof, the method utilizing an annular die which may be selectively configurated to be received within or disposed about a moving tube, and the die being sized to provide for the flow of air between the die and the tube to be cut off through the use of the die, the method including the supplying of air under pressure between the tube and the die wherein the air supports the tube out of contact with the die and functions as a bearing for the tube moving through the die, exerting a force on the tube to distort the same locally into engagement with the die to effect the cutting off of a portion thereof and at the same time momentarily retarding the passage of air between the die and the tube so as to effect a momentary build up of air pressure between the die and the tube with the localized pressure being effective to re-form the distorted tube immediately subsequent to the cut off operation whereby the tube is rapidly moved out of contact with the die and is free to pass therethrough.

A further object of this invention is to provide a novel method of supplying air under pressure between a moving tube and a die component, the method including the provision of a die with a minimal clearance with the tube to be associated therewith whereby as the rapidly moving tube passes relative to the die, the viscous drag of the air on the tube will be utilized for the ramming of air into the space between the tube and the die to effect the necessary pressure build up and the utilization of such pressurized air as a bearing between the tube and the die.

Yet another object of this invention is to provide a novel method of supporting an axially moving tube during the cutting off thereof, the method including the provision of inner and outer cut off components of which one is a support for a force applying element and the other is a die cooperable with the force applying element to effect the cutting off of the tube, and supporting the moving tube out of contact with both the support and the die by introducing air or inert gases under pressure through both the support and the die to effect the build up of gaseous pressure between the tube and both the support and the die whereby the pressurized gas serves to function as a gaseous bearing to support the tube out of contact with both the support and the die, and the pressurized gas further serving to re-form the tube after the cutting off of a section of the tube from the main tube.

This invention also relates to novel apparatus for effecting the cut off of a tube. In accordance with this invention, a die having a continuous cutting edge is provided. This die has associated therewith a force applying member, which is preferably in the form of a coil for generating a magnetic repulsive feel directed towards the die whereby a portion of the tube moving between the coil and the die, upon the energization of a coil, is forced outwardly against the die cutting edge to effect the severing of the tube, the coil being carried by a support, and there being provided means for supplying air between the moving tube and both the die and the coil support with the air functioning as a bearing for the moving tube.

A still further object of this invention is to provide an apparatus in accordance with the foregoing wherein both the coil support and the die are provided with means for delivering air or inert gases under pressure through the opposed surfaces thereof to assure a proper supply of pressurized air or gas between the surfaces of both the support and the die and the tube.

With the above and other objects in view that will hereinafter appear, the nature of the invention will be more clearly understood by reference to the following detailed description, the appended claims and the several views illustrated in the accompanying drawing.

In the drawing:

FIGURE 1 is a persepctive view with a portion thereof broken away and shown in section of the apparatus of this invention and shows a tube passing therethrough.

FIGURE 2 is an enlarged fragmentary longitudinal vertical sectional view taken along the line 2—2 of FIGURE 1 and shows more specifically the details of the apparatus and the relationship of the tube thereto.

FIGURE 3 is an enlarged fragmentary sectional view showing only a portion of the apparatus and illustrating the tube at the moment of the cut off of a section thereof.

FIGURE 4 is an enlarged fragmentary transverse vertical sectional view taken along the line 4—4 of FIGURE 2 and shows the specific configuration of the die and the coil support for the passage of compressed air and inert gases therethrough for the purpose of supporting the tube.

Referring now to the drawing in detail, it will be seen that there is illustrated a typical embodiment of the invention for use in cutting off a tube which is referred to by the numeral 5. In accordance with the invention, the tube 5 is passed over a support 6 and within a die 7. The support 6, of which only a portion is shown, may be in the form of a horn of the apparatus for forming the tube 5. The die 7 may be supported in any desired manner concentric with the support 6 and the means for mounting the die 7 are not shown.

At this time it is pointed out that the tube 5 may be of any desired construction. However, the invention is particularly adapted to the cutting off of continuously formed tubes wherein the tubes have longitudinal seams formed by a welding process.

In order to effect the severing of the tube 5, the die 7 is internally configurated to define a continuous cutting edge 8 which surrounds the moving tube 5. The die 7 is relieved, as at 9, immediately downstream of the cutting edge 8 to allow for the outward expansion of the tube as is required to effect the cutoff of a portion thereof.

In order to direct an outward force on the moving tube 5 to effect the shearing thereof against the cutting edge 8, the support 6 carries a coil 10. The specific construction of the coil 10 and the manner in which current is pulsed therethrough is not a feature of this invention, and theerfore, will not be described in further detail here. However, it is to be understood that the coil 10 is particularly adapted to receive a discharge of stored electrical energy, which energy, through the coil 10, will serve to induce in the moving tube 5 a repelling force directing the tube 5 towards the cutting edge 8. This repelling force will be sufficient to momentarily distort the tube 5 to the extent taht it will come into pressure contact with the cutting edge 8 and be sheared thereby. The coil 10, as is clearly shown in FIGURE 3, is recessed within the support 6 by being located in an annular groove 11.

It is readily apparent that it is undesirable for the tube 5 to engage either the support 6 or the die 7 due to the frictional drag forces involved. Furthermore, the tube 5 may be coated either internally or externally or both and such frictional engagement with a supporting surface will result in the damaging or scraping away of the coating. The coating on the tube 5 may be in the form of a protective coating on the internal surface and a decorative coating on the external surface.

Although it is desired that the moving tube 5 not be disposed in guided engagement with the die 7, it is also highly desirable that the tube 5 be supported at the time the repelling force is induced thereinto by the coil 10 in order to prevent undesired distortion of the tube. Furthermore, the tube has a tendency to become out of round due both to the fact that the tube is formed of very thin gauge metal and certain portions thereof have been differently stressed in the forming thereof. It is, therefore, necessary to prevent paneling and out-of-roundness of the tube to thereby assure that the tube 5 will not come into direct frictional engagement with either the support 6 or the die 7. In order to accomplish the proper supporting of the tube 5, it is proposed to utilize gases, primarily air, under pressure as bearing means between the tube and the support on one hand and the tube and the die on the other hand.

The guiding of the tube 5 with respect to the support 6 is accomplished by providing the support 6 with a longitudinal bore 12 which may be connected in any desired manner (not shown) to a source of pressurized gas. The support 6 is provided adjacent the coil 10 with an annular peripheral recess 13. The recess 13 is placed in communication with the bore 12 by a plurality of radially extending bores 14. Thus, compressed gases delivered to the support 6 through the bore 12 will pass out through the bores 14 and into the recess 13. These gases, which are under pressure, will then pass into the space between the support 6 and the tube 5 in the manner shown in FIGURE 3 so that the tube 5 is supported by the gas under pressure disposed between the tube 5 and the support 6. The gas under pressure within the tube 5 will automatically tend to maintain the roundness of the tube 5 and expand the same so as to eliminate any possible paneling.

Referring once again to FIGURE 3, it will be seen that the central portion of the die 7 is so dimensioned whereby a very close clearance is maintained between the die 7 and the tube 5 moving therethrough. It is to be noted that this central portion, which is referred to by the numeral 15, is disposed immediately in advance of the cutting edge 8 of the die 7. The close tolerance between the outside diameter of the tube 5 and the internal diameter of the middle portion of the die 7 provides a restriction against the flow of air through the die 7 outside of the tube 5.

The die 7 is also provided with an annular groove 16 which opposes the annular groove 13 of the support 6. At the upstream end of the die 7, the internal surface of the die is spaced apart from the tube path a considerable distance to define an annular passage 17. The annular passage 17 opens into the annular groove 16 through an intermediate portion 18. The internal surface of the die 7 is also configurated to define a diverging passage portion 19 between the annular groove 16 and the very narrow passage defined by the middle portion 15 of the die 7, this very narrow passage being referred to by the numeral 20.

The die 7 is provided with an external conduit 21 which may be formed in any desired manner, but which is illustrated as being formed by means of a channel shaped member 22 suitably secured to the exterior surface of the die 7. A plurality of radiating passages 23 extends between the conduit 21 and the annular groove 16 for the purpose of supplying air and other compressed gases into the groove 16. A suitable gas supply line 24 is secured to the channel member 22, as is shown in FIGURE 4.

It is well known that as the tube 5 rapidly moves towards the die 7, the surrounding air is moved with the tube because of the viscous drag of the air on the tube. The stepped arrangement of the grooved inner surface of the die 7 acts as a natural pressure raiser. Accordingly, when the tube 5 is moving through the die 7, sufficient air is drawn into the die 7 through the passage 17 to provide for the necessary supporting of the tube 5 out of engagement with the die 7. However, static air pressure is required when the tube is standing still and until it has built up to the operating speed thereof. This static air pressure is delivered through the die 7 by means of the supply line 24, the conduit 21 and the passages 23. At this time it is also pointed out that it is feasible to continue to supply compressed air to the interior of the die 7 through the air passages 23 during the normal operation of the apparatus. Furthermore, there are instances where inert gases are desired and in these instances the inert gas will be continuously supplied during the operation of the cut off apparatus.

It will be readily apparent that air or other gases moving with the tube 5 through the die 7 will be compressed within the space or passage 20 so as to provide an adequate support for the tube 5. When the coil 10 is energized and the tube 5 temporarily expanded into shearing engagement with the cutting edge 20, it will be seen that the momentary engagement of the metal of the tube with the die will result in the sealing of the left-hand end of the passage 20, thus causing a temporary pressure build-up. The pressure will be sufficient to restore the distorted area of the tube to its normal configuration.

From the foregoing, it will be seen that a very simple tube supporting bearing arrangement has been provided and which may be readily incorporated in a desired type of cut off apparatus without in any way interfering with the tube movement or the cut off operation. At the same time, the air or gas bearing of the apparatus assures the proper supporting of the tube and positively eliminates any damage to the surface of the tube through the engagement thereof with either the support or the die.

Although the die has been illustrated as being an external die and the coil has been illustrated within the moving tube for exerting an outwardly directed force thereon, it is to be understood that the positions of the support and the die may be interchanged so that the die is an internal die and the coil is externally mounted.

It is also to be understood that other minor modifications may be made in the example apparatus disclosed herein within the spirit and scope of the invention, as defined in the appended claims.

I claim:

1. A method of supportingly guiding and positioning a tube during cut-off thereof by a die while moving through the die including the steps of delivering air into the die around the tube, and restricting the escape of air through the die in the direction of tube movement through the die and effecting a pressure build up within the die around the tube to support the tube against distortion during the cut-off thereof.

2. The method of claim 1 wherein the delivered air is at least in part dynamic air drawn into an entrance end of the die around the tube by the moving tube.

3. The method of claim 1 wherein the delivered air is at least in part static air delivered radially through the die.

4. The method of claim 1 wherein the delivered air is in part dynamic air drawn into an entrance end of the die around the tube by the moving tube and in part static air delivered radially through the die.

5. A method of supportingly guiding and positioning a tube during cut-off thereof while moving through a die and around an outwardly force applying member comprising the steps of delivering air into the die around the tube, restricting the escape of air through the die in the direction of tube movement through the die to effect a pressure build up within the die around the tube, and internally pressurizing the tube generally around the force applying member and generally in opposition to the pressure of the first-mentioned air.

6. A method of supportingly guiding and positioning a tube during cut-off thereof while moving through a die comprising the steps of delivering air into the die around the tube, restricting the escape of air through the die in the direction of tube movement through the die to effect a pressure build up within the die around the tube, exerting an outwardly directed force on the tube to effect a shearing engagement of the tube with the die, and then removing the force from the tube with the pressurized air in the die reshaping the tube and again spacing the tube from the die.

7. A method of suportingly guiding and positioning a continuously moving tube within a bearing sleeve closely surrounding but spaced from the moving tube, comprising the steps of delivering air into the bearing sleeve around the moving tube, and restricting the escape of air through the bearing sleeve in the direction of tube travel to effect a pressure build up within the bearing sleeve around the tube.

8. The method of claim 7 wherein the delivered air is at least in part dynamic air drawn into an entrance end of the bearing sleeve around the tube by the moving tube.

9. The method of claim 7 wherein the delivered air is at least in part static air delivered radially through the bearing sleeve.

10. A method of guiding and positioning an axially moving tube during the movement thereof relative to apparatus including a member which has a continuous periphery corresponding to the outline of the tube, comprising the steps of arranging the tube and the member in radially spaced telescoped relation, delivering a compressed gas between the member and the tube, and restricting the escape of gas from between the member and the tube in the direction of tube travel to effect a pressure build up between the member and the tube.

11. A method of guiding and positioning an axially moving tube during the movement thereof relative to apparatus including a member which has a continuous periphery corresponding to the outline of the tube, comprising the steps of arranging the tube and the member in radially spaced telescoped relation, delivering a compressed gas between the member and the tube, restricting the escape of gas from between the member and the tube in the direction of tube travel to effect a pressure build up between the member and the tube, bringing the movement of the tube up to a speed wherein the viscous drag of the tube on the surrounding gas will draw the gas in between the tube and the member, and then discontinuing the supplying of the compressed gas.

12. An apparatus for guidingly supporting and cutting off a moving tube comprising a die and a magnetic impulse coil disposed in spaced concentric aligned relation for the passage of a tube between said die and said coil, said magnetic impulse coil being adapted to press a tube against said die to sever the tube, and means for retaining air under pressure between said die and a tube moving relative to said die to space the tube from said die during the normal movement of a tube relative to said die and to reform the severed edge of the tube after it has been pressed against said die by said magnetic impulse coil.

13. An apparatus for guidingly supporting and cutting off a moving tube comprising a die and a magnetic impulse coil disposed in spaced concentric aligned relation for the passage of a tube between said die and said coil, means for retaining air under pressure between said die and a tube moving relative to said die to space the tube from said die during the normal movement of a tube relative to said die and to move the tube away from said die after the imparting of a cutting force to the tube, a support for said coil, and means for retaining air under pressure between said coil support and said tube.

14. The apparatus of claim 12 wherein said die is generally cylindrical for the passage of a tube therethrough, and at least a central portion of said die closely confining the path of a tube therethrough whereby leakage of air between said die and the tube in he direction of tube movement through said die is restricted.

15. The apparatus of claim 12 wherein said die is generally cylindrical for the passage of a tube therethrough, said die having an enlarged entrance portion whereby dynamic air may be drawn into said die by a moving tube, and at least a central portion of said die closely confining the path of a tube therethrough whereby leakage of air between said die and a tube in the direction of tube movement through said die is restricted and a pressure build up within said die will occur.

16. The apparatus of claim 12 wherein said die is generally cylindrical for the passage of a tube therethrough, at least a central portion of said die closely confining the path of a tube therethrough whereby leakage of air between said die and the tube in the direction of tube movement through said die is restricted, and means for introducing static air into said die through said die upstream of said central portion.

17. The apparatus of claim 13 wherein said die is generally cylindrical for the passage of a tube therethrough, said coil support is in the form of a large cross sectional horn, said die and said horn having radial air passages for supplying said air under pressure.

18. An apparatus for guidingly supporting an axially moving tube comprising a member having a peripheral surface of a configuration adapted to telescopically mate with a particular tube configuration, said peripheral surface being configurated relative to the intended path of the tube to define a passage having an enlarged upstream entrance, at least one stepped reduction in the passage and a restricted downstream portion whereby the viscous drag of the tube on air will draw air into said passage through said entrance opening and such air will be compressed because of the configuration of said passage to support the tube.

19. The apparatus of claim 18 together with means for supplying compressed air to said passage during the time the movement of the tube is being initiated to initially center and support the tube.

References Cited
UNITED STATES PATENTS

| | | | |
|---|---|---|---|
| 1,641,276 | 9/1927 | Huntington | 226—7 |
| 2,976,907 | 3/1961 | Harvey et al. | 29—421 |
| 3,171,014 | 2/1965 | Ducati | 72—56 |

CHARLES W. LANHAM, *Primary Examiner.*